United States Patent [19]

Blyth

[11] Patent Number: 4,685,768
[45] Date of Patent: Aug. 11, 1987

[54] COLOR CONTROL IN HOLOGRAMS

[75] Inventor: Jeffrey Blyth, Brighton, England

[73] Assignee: Blyth Holographics Limited, London, England

[21] Appl. No.: 800,672

[22] Filed: Nov. 22, 1985

[51] Int. Cl.⁴ ............................................. G03H 1/04
[52] U.S. Cl. ..................................... 350/320; 283/87; 430/1
[58] Field of Search .................. 350/320, 3.6; 283/87; 430/1, 2

[56] References Cited
U.S. PATENT DOCUMENTS
4,563,024  1/1986  Blyth ................................... 350/320

Primary Examiner—Bruce Y. Arnold
Attorney, Agent, or Firm—Lee, Smith & Zickert

[57] ABSTRACT

Color control in a Denisyuk type hologram having interference fringes lying generally parallel to the substrate is effected by subjecting the initially produced hologram to resensitizing, controlled re-exposure, second development and second bleaching steps, of which the effect is to remove silver produced by the second exposure so as to enable the playback interference fringes to move closer together.

10 Claims, No Drawings

COLOR CONTROL IN HOLOGRAMS

FIELD OF THE INVENTION

This invention relates to a method of controlling the colour or colours of holograms and to a hologram produced by such method.

RELATED APPLICATION

My U.S. Patent Application S.N. 476554 (now U.S. Pat. No. 4,563,024) discloses a hologram of the Denisyuk type, wherein the interference fringes lie in layers approximately parallel to the substrate. The holographic image is seen by a diffraction effect when the hologram is viewed by reflected light, i.e. viewed from the same side as that providing the incident light.

In general, if the substrate of the holographic film is in an artificially contrived neither swollen nor contracted state as compared to its state while being produced by an exposure to laser light, then under white light illumination the holographic image will be seen in the same colour as that of the original laser light.

In my above-mentioned patent application, there is disclosed a method of selective development of a film which has been exposed to produce a holographic image therein, as a result of which the film emulsion is deformed to alter the spacing between the interference fringes, thus causing the colour of the viewed image to be different to that of the original laser light. It is possible to achieve selective deformation over only part or parts of the area of the hologram, whereby the viewed image becomes multicoloured. Such a multicoloured hologram is non-reproducible, even by the most practical method, which is the Denisyuk single beam system using a turnable laser, because if the laser is initially tuned to one colour to effect reproduction at regions of the hologram of that colour, other regions of the hologram of different colour will become fogged and reproduction at these latter regions then produces a very unsatisfactory result to the would-be forger, even if the laser is returned to match the different colour.

OBJECT OF THE PRESENT INVENTION

It is an object of the present invention to provide an alternative method of effecting colour control in a hologram of the Denisyuk type above referred to.

BRIEF SUMMARY OF THE INVENTION

According to one aspect of the present invention, a hologram of the type having interference fringes lying generally parallel to the substrate is produced by exposure to laser light in a conventional manner and is at least partially developed and stopped, and the film is then further exposed to light of sufficient intensity and for a sufficient duration to enable a second development step and then a bleaching step to be effected.

The second exposure does not demand the use of laser light; any light sufficiently "actinic" to enable the second development is adequate.

The result of the second development and bleaching is a change in the physical thickness of the emulsion as compared to that when it was subjected to the original laser light exposure and, in consequence, the hologram is seen in a different colour to that of the original laser light.

A preferred method employs a mask to control the second exposure, whereby both the amount of colour change and the area(s) of the hologram at which the colour is changed can be selected according to requirements.

After the initial exposure to laser light, a subsequent usually partial development may be stopped, i.e. by immersing the holographic film in a development stop bath, commonly an acid bath. Alternatively, the subsequent at least partial development may be followed by a bleaching step, which may also be considered a development stop. In either case, stopping is preferably effected without fixing.

The method is especially effective if, when first and second bleach steps are involved, the second bleach step is carried out by use of a solvent bleach system, whereby the silver produced by the second development is bleached out. This results in a readily controllable contraction of the film substrate containing the holographic image, over at least a part of the area thereof. In contrast, the bleaching step carried out after the original laser light exposure and development desirably uses the more conventional "rehalogenating" bleach system, whereby the silver is reconverted to an insoluble salt. However, under some circumstances, the same type of bleach, whether a rehalogenating bleach or a solvent bleach, may be employed for both bleach steps.

The invention also relates to a hologram of the Denisyuk type previously referred to, wherein the viewed colour thereof over at least a part of its area has been changed due to deformation of the substrate resulting from a second exposure to light subsequent to the initial development of the laser-light produced holographic image.

DESCRIPTION OF EMBODIMENTS

In an example, using a silver halide recording material, a holographic image is produced by the Denisyuk single beam technique which results in an image seen by interference fringes running generally parallel to the substrate. The laser is initially tuned to red light of a given frequency.

The recording material is now developed and bleached in a conventional manner, but without an intermediate fixing step. Bleaching is carried out using a "rehalogenating" bleach, typically a bleach containing bromide ions such as Agfa formulation GP 432, whereby the silver in the exposed areas is reconverted to silver bromide or another insoluble salt.

At this stage the film is preferably re-sensitized. The bleached hologram is resensitized to light by use of a resensitizing solution. Many known ways exist of making silver halide sensitive to light by subjecting film to a reducing environment. However, in the present instance it is convenient to restore the hologram to the developer under light-excluded conditions. The hologram is then preferably washed and dried, again under light-safe conditions, since although this marginally reduces subsequent light sensitivity the subsequent steps can be carried out more cleanly.

The film containing the holographic image is now re-exposed to light of sufficient intensity and for a sufficient duration to enable a second development to be effected. The second exposure does not necessitate the use of laser light, although the latter may sometimes be employed, and the degree and area(s) of exposure are controlled using a suitable continuous or half-tone mask. Alternatively, a light projection system giving a varying pattern of light may be employed, or indeed any other means of rendering the re-exposure to light of non-uniform nature may be utilised.

Most desirably, the hologram is now efficiently washed in distilled water to free it of any traces of soluble salts which could be converted to or produce insoluble salts in the second bleaching step which is to follow.

After a second development, the film is again bleached. A "solvent" bleach system is employed, whereby the silver produced by the second exposure and development is actually bleached out or dissolved away, as the bleach is devoid of silver-reacting ions such as halide ions. A typical bleach able to dissolve developed silver is an acidified dichromatic salt exemplified by 10 g. ammonium dichromate in one liter of very dilute sulphuric acid. Alternatively, a solution of ferric nitrate in water can be suitable. Other water-soluble oxidising agents unable to form insoluble silver salts can also be employed. This step results in a controlled thinning of the film substrate in accordance with the mask-controlled second exposure. Thus, the silver produced by the second exposure and development steps is dissolved out by the second bleach, and the physical removal of this material leaves the interference fringes seen on playback (which fringes lie roughly parallel to the substrate) lying closer together, in accordance with the selective area and intensity control of the light used to effect the second exposure.

Thus, due to the controlled thinning of the substrate, the interference fringes produced when the hologram is viewed are, at least over one or more parts of the area of the hologram, moved closer together. Consequently, in accordance with the control exerted during the second exposure, at least the said part or parts of the holographic image are seen as a colour different to the red colour of the original laser light, and instead appear as light of a shorter wavelength, green or blue, for example.

It will be appreciated that the above described example of the method and hologram in accordance with the invention may be modified in various ways within the scope of the invention which has been hereinbefore defined.

I claim:

1. A method of effecting colour control in a hologram of the type having interference fringes lying generally parallel to the substrate, according to which:-
   (a) the holographic film is initially exposed to laser light in a conventional manner in order to produce a coloured holographic image of the aforesaid type,
   (b) the hologram is at least partially developed and stopped,
   (c) the film is further exposed to light of sufficient intensity and for sufficient duration to enable a second development step and then a bleaching step to be effected, thereby to change the colour of the holographic image from that produced by the original exposure to laser light.

2. A method according to claim 1, wherein step (b) comprises development and stopping without fixing.

3. A method according to claim 1, according to which the further exposure to light is effected with light of differing intensities at differing areas of the film.

4. A method according to claim 1, wherein step (b) includes stopping by use of a development stop solution.

5. A method according to claim 1, wherein step (b) includes stopping by use of a bleach.

6. A method according to claim 5, according to which the first bleaching step is effected using a rehalogenating bleach.

7. A method according to claim 1, according to which the terminal bleaching step is effected using a solvent bleach which dissolves silver produced by the second exposure and development.

8. A method according to claim 1, according to which, prior to the second exposure step, the film is resensitized.

9. A method according to claim 8, according to which the film is resensitized by returning the film to the developer under a light-excluded condition.

10. The product produced by the method of claim 1.

* * * * *